United States Patent [19]

Hahn et al.

[11] Patent Number: 5,257,523
[45] Date of Patent: Nov. 2, 1993

[54] CAN BODY MAKER WITH MAGNETIC RAM BEARING AND REDRAW ACTUATOR

[75] Inventors: Roger A. Hahn, Arvada; Phillip W. Gold, Lakewood; Harold Cook, Jr., Evergreen, all of Colo.

[73] Assignee: Coors Brewing Company, Golden, Colo.

[21] Appl. No.: 912,811

[22] Filed: Jul. 13, 1992

Related U.S. Application Data

[63] Continuation of Ser. No. 724,881, Jul. 2, 1991, abandoned, which is a continuation-in-part of Ser. No. 578,938, Sep. 7, 1990, abandoned.

[51] Int. Cl.[5] .............................................. B21D 22/28
[52] U.S. Cl. ....................................... 72/349; 72/351; 72/430
[58] Field of Search ................... 72/347, 349, 350, 351, 72/361, 430; 100/917; 310/14, 15

[56] References Cited

U.S. PATENT DOCUMENTS

| | | |
|---|---|---|
| 1,606,141 | 11/1926 | Brown .................................. 72/430 |
| 1,607,931 | 11/1926 | White . |
| 2,083,168 | 6/1937 | Larson . |
| 2,260,402 | 10/1941 | Potdevin . |
| 2,425,914 | 9/1947 | Blackley et al. . |
| 2,520,688 | 8/1950 | Meyer et al. . |
| 2,566,399 | 9/1951 | Bishop . |
| 2,951,437 | 9/1960 | Diener ................................. 100/917 |
| 3,289,453 | 12/1966 | Wyle et al. . |
| 3,314,274 | 4/1967 | Langewis et al. . |
| 3,390,565 | 7/1968 | Smith et al. . |
| 3,399,558 | 9/1968 | Smith et al. . |
| 3,441,819 | 4/1969 | Palmero ................................ 310/15 |
| 3,511,076 | 5/1970 | Kapke . |
| 3,557,598 | 1/1971 | Langewis et al. . |
| 3,584,496 | 6/1971 | Keller . |
| 3,696,657 | 10/1972 | Maytag . |

(List continued on next page.)

FOREIGN PATENT DOCUMENTS

| | | |
|---|---|---|
| 24842 | 10/1922 | France . |
| 8100022 | 9/1981 | PCT Int'l Appl. . |
| 9115051 | 10/1991 | PCT Int'l Appl. . |
| 453220 | 12/1974 | U.S.S.R. . |

OTHER PUBLICATIONS

Pamphlet entitled "Linear Induction Motors" of Northern Magnetics, Inc., Van Nuys, Calif., pp. 1-6.
Pamphlet by Northern Magnetics, Inc., Van Nuys, Calif. pp. 11-13 and 15-17.
Design Bulletin No. 4 of Northern Magnetics, Inc., Van Nuys, Calif. (Jan. 1978), pp. 1-13 and Tables.
Technical bulletin #769-3 of Northern Magnetics, Inc., Van Nuys, Calif.
Article entitled "Linear Induction: A New Way to Go," *Mechanix Illustrated* (Dec. 1975), pp. 38-40.

*Primary Examiner*—Lowell A. Larson
*Attorney, Agent, or Firm*—Klaas, Law, O'Meara & Malkin

[57] ABSTRACT

A can body maker apparatus including a stationary support frame; a housing having forming and ironing dies located therein mounted on the support frame; an elongated ram; a reciprocating ram drive; and a redraw assembly which includes a redraw sleeve for supporting a can body preform thereon; a redraw carriage for supporting and axially displacing the redraw sleeve relative the ram; a redraw electromagnetic coil fixedly positioned relative the stationary support frame; and a permanent magnet fixedly mounted with respect to the redraw carriage in displaceable relationship with the coil along the coil axis for coacting with the electromagnetic field produced by the coil for controllably reciprocatingly displacing the redraw carriage.

35 Claims, 11 Drawing Sheets

U.S. PATENT DOCUMENTS

| | | |
|---|---|---|
| 3,735,629 | 5/1973 | Paramonoff . |
| 3,742,850 | 7/1973 | Sedlak . |
| 3,793,871 | 2/1974 | Kinghorn . |
| 3,877,761 | 4/1975 | Boden et al. . |
| 3,955,394 | 5/1975 | Kaufman et al. . |
| 3,957,005 | 5/1975 | Heffner . |
| 4,141,604 | 2/1979 | Habermann et al. . |
| 4,173,138 | 11/1979 | Main et al. . |
| 4,180,296 | 12/1979 | Habermann . |
| 4,353,602 | 10/1982 | Habermann . |
| 4,473,259 | 9/1984 | Goldowsky . |
| 4,504,098 | 3/1985 | Battarel et al. . |
| 4,578,981 | 4/1986 | Nishikawa et al. . |
| 4,583,794 | 4/1986 | Takahara et al. . |
| 4,585,282 | 4/1986 | Bosley . |
| 4,597,613 | 7/1986 | Sudo . |
| 4,614,104 | 9/1986 | Straw . |
| 4,642,500 | 2/1987 | Higuchi et al. . |
| 4,675,496 | 6/1987 | Toyoshima et al. . |
| 4,795,927 | 1/1989 | Morii et al. . |
| 4,807,459 | 2/1989 | Grims et al. . |
| 4,827,163 | 5/1989 | Bhate et al. ............................ 310/15 |
| 4,827,169 | 5/1989 | Habermann . |
| 4,841,212 | 6/1989 | Matsushita et al. . |
| 4,892,328 | 1/1990 | Kurtzman et al. . |
| 4,912,343 | 3/1990 | Stuart . |
| 4,934,167 | 6/1990 | Grims et al. . |
| 4,947,667 | 8/1990 | Gunkel et al. . |
| 4,969,662 | 11/1990 | Stuart . |
| 4,974,439 | 12/1990 | Saunders et al. . |
| 5,058,408 | 10/1991 | Leftault, Jr. et al. . |

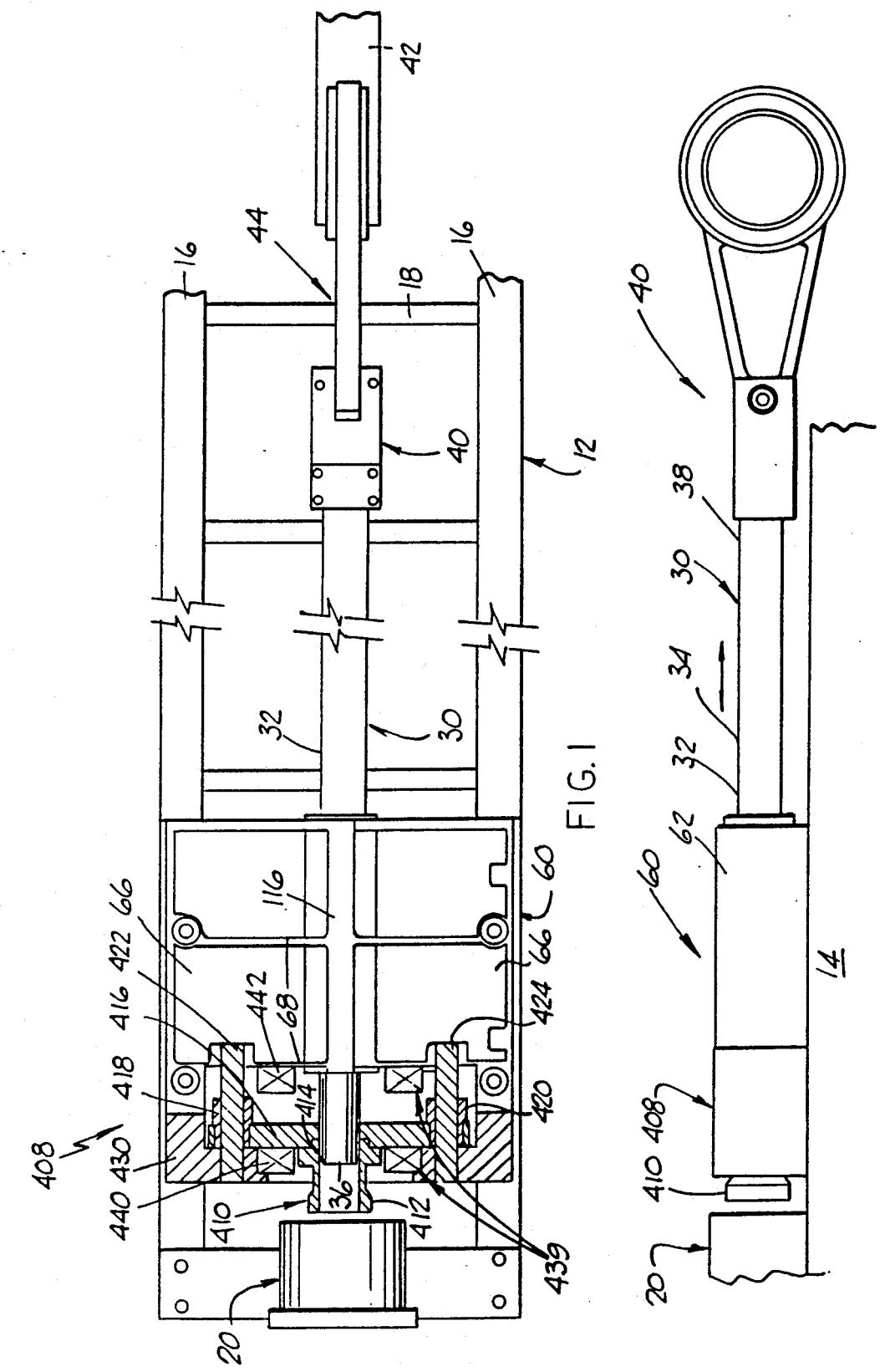

CAN BODY MAKER WITH MAGNETIC RAM BEARING AND REDRAW ACTUATOR

The present application is a continuation of copending U.S. patent application Ser. No. 724,881 filed Jul. 2, 1991 for CAN BODY MAKER WITH MAGNETIC RAM BEARING AND REDRAW ACTUATOR of Roger. A. Hahn, Phillip Wayne Gold, and Harold Cook, Jr., now abandoned, which is a continuation-in-part of copending U.S. patent application Ser. No. 578,938 filed Sep. 7, 1990 for CAN BODY MAKER WITH MAGNETIC RAM BEARING AND REDRAW ACTUATOR of Roger A. Hahn and Phillip Wayne Gold, also now abandoned, which is hereby specifically incorporated by reference for all that are disclosed therein.

FIELD OF THE INVENTION

This invention relates generally to a can body making apparatus and more particularly to a ram assembly and a redraw assembly thereof.

BACKGROUND OF THE INVENTION

A can body making apparatus is described in U.S. Pat. No. 3,696,657 issued to J. H. Maytag, which is hereby incorporated herein by reference for all that it discloses. The ram carriage and redraw carriage are each mounted on rollers which move over carriage way strips. Each pair of upper and lower rollers are urged toward each other so as to be in firm contact with the carriage way strip located therebetween. Both the ram and redraw carriages are reciprocated at rates sufficient to form about two hundred cans a minute. The constant reciprocal movement of the ram and redraw carriages and the tight engagement of the rollers on the carriage way strips result in wear which causes misalignment of the ram or of the can blanks by the redraw sleeve. It is understood that this misalignment is small, between about 0.005 and 0.010 of an inch, but such misalignment can result in defective cans.

U.S. Pat. No. 4,934,167 of Grims et al., which is hereby incorporated by reference for all that it discloses, describes a can body making apparatus having an elongated ram which is connected to apparatus for producing straight line reciprocating motion and which is supported solely by a liquid bearing during the reciprocation thereof.

The Grims et al. patent also discloses a redraw apparatus for a can body making apparatus wherein the redraw carriage is slidably mounted on a pair of spaced apart support posts for reciprocal movement thereover. The support posts are fixedly mounted on a housing holding can forming and ironing dies.

Other U.S. patents which also describe body maker apparatus, which are all hereby specifically incorporated by reference for all that they disclose, are as follows: U.S. Pat. No. 4,614,104 of Straw; U.S. Pat. No. 4,578,981 of Nishikawa et al.; U.S. Pat. No. 4,173,138 of Main et al.; U.S. Pat. No. 3,955,394 of Kaufman et al.; and U.S. Pat. No. 3,735,629 of Paramonoff.

In certain fields of technology outside the present field of invention it is known to use magnet assemblies to support a moveable shaft. Magnet assemblies for supporting a moveable shaft are described in the following U.S. Patents which are hereby specifically incorporated by reference for all that is disclosed therein: U.S. Pat. No. 4,912,343 of Stuart; U.S. Pat. No. 4,892,328 of Kurtzman et al.; U.S. Pat. No. 4,831,212 of Matsushita et al.; U.S. Pat. No. 4,827,169 of Haberman; U.S. Pat. No. 4,795,927 of Morii et al.; U.S. Pat. No. 4,642,500 of Higuchi et al.; U.S. Pat. No. 4,597,613 of Sudo; U.S. Pat. No. 4,583,794 of Takahara et al.; U.S. Pat. No. 4,504,098 of Battarel et al.; U.S. Pat. No. 4,473,259 of Goldowsky; U.S. Pat. No. 4,353,602 of Habermann; U.S. Pat. No. 4,180,296 of Habermann; U.S. Pat. No. 4,141,604 of Habermann et al.; and U.S. Pat. No. 3,877,761 of Boden et al.

SUMMARY OF THE INVENTION

The present invention is directed to a can body maker which employs electromagnets in both a ram supporting bearing assembly and in a redraw carriage actuator. The electromagnets are energized and deenergized based upon ram position so as to maintain the ram at a radially centered position in a predetermined reciprocation path and so as to actuate the redraw carriage at appropriate times during a ram stroke.

Thus, the invention may comprise a method of maintaining a reciprocating ram of a can body maker apparatus in alignment with a predetermined linear reciprocation axis comprising the steps of: mounting a plurality of separately energizable electromagnets in an annular arrangement about a first predetermined axial portion of said linear reciprocation axis; selectively energizing said electromagnets so as to urge a portion of said ram which is circumscribed by said plurality of electromagnets into coaxial relationship with said reciprocation axis.

The invention may also comprise a method of actuating a redraw carriage which is reciprocally mounted on a can body maker comprising the steps of: mounting a first electromagnet assembly relatively forward of the redraw carriage; mounting a second electromagnet assembly relatively rearward of the redraw carriage; energizing the first electromagnet assembly so as to initiate a forward displacement of the redraw carriage; energizing the second electromagnet assembly so as to initiate a rearward displacement of the redraw carriage.

The invention may also comprise can body making apparatus for forming can blanks into elongated can bodies comprising: a stationary support frame; a housing having forming and ironing dies located therein mounted on said support frame; an elongated ram having a first end portion and a second end portion, said first end portion having a generally cylindrical outer surface for movement into said redraw assembly to contact a can blank in said redraw assembly and to move said can blank out of said redraw assembly and through said forming and ironing dies to form an elongated can body, said first end portion being constructed at least partially from magnetic material; reciprocating drive means for providing reciprocating axial displacement for said elongated ram; connecting means on said ram second end portion for connecting said elongated ram to said reciprocating drive means; and magnetic bearing means mounted on said support frame for radially centering and frictionlessly supporting said ram first end portion during reciprocating axial displacement of said ram.

The invention may also comprise can body making apparatus for forming can blanks into elongated can bodies comprising: a stationary support frame; a housing having forming and ironing dies located therein mounted on said support frame; an elongated ram having a first end portion and a second end portion, said first end portion having a generally cylindrical outer surface for movement into said redraw assembly to contact a can blank in said redraw assembly and to move said can blank out of said redraw assembly and through said forming and ironing dies to form an elongated can body, said first end portion being constructed at least partially from magnetic material-reciprocating drive means for providing reciprocating axial displacement for said elongated ram; connecting means on said ram second end portion for connecting said elongated ram to said reciprocating drive means; and a redraw assembly located adjacent to said housing, wherein said redraw assembly comprises: a redraw sleeve for supporting a can body preform thereon; redraw electromagnet means fixedly positioned relative said stationary support frame at a location forward of said redraw carriage means for urging said redraw carriage means forwardly during an energized state thereof; second redraw electromagnet means fixedly positioned relative said stationary support frame at a location rearward of said redraw carriage means for urging said redraw carriage means rearwardly during an energized state thereof.

The invention may also comprise a can body maker apparatus of the type having an axially reciprocal ram member and an axially reciprocal redraw carriage comprising: ram position sensing means for sensing the position of said ram member and for generating a ram position signal in response thereto; electromagnetic bearing means for frictionlessly radially supporting and aligning one end of said ram member with a predetermined ram displacement path; electromagnetic redraw carriage actuator means for applying magnetic force to said redraw carriage means for reciprocating said redraw carriage means; control means for selectively energizing and deenergizing electromagnets in said electromagnetic bearing means and said electromagnetic redraw means in response to said ram position signal.

The present invention may also comprise a can body making apparatus for forming can blanks into elongated can bodies comprising: a stationary support frame; a housing having forming and ironing dies located therein mounted on said support frame; an elongated ram having a first end portion and a second end portion, said first end portion having an outer surface adapted for movement into a redraw assembly to contact a can blank in said redraw assembly and to move said can blank out of said redraw assembly and through said forming and ironing dies to form an elongated can body; reciprocating drive means for providing reciprocating axial displacement for said elongated ram; and a redraw assembly located adjacent to said housing, wherein said redraw assembly comprises: a redraw sleeve for supporting a can body preform thereon; redraw carriage means for supporting and axially displacing said redraw sleeve relative said elongated ram; redraw electromagnetic coil means fixedly positioned relative said stationary support frame and having a central coil axis for selectively providing an electromagnetic field; permanent magnet means fixedly mounted with respect to said redraw carriage means in displaceable relationship with said coil means along said central coil axis for coacting with said coil means for controllably reciprocatingly displacing said redraw carriage means.

The present invention may also comprise, in a can body maker apparatus of the type having a stationary support frame, a ram assembly which is reciprocatingly displaceable relative the support frame and a redraw assembly which is reciprocatingly displaceable relative the support frame, a method of reciprocating the redraw assembly comprising the steps of: mounting a magnetic coil assembly having a central longitudinal axis in fixed relationship with said support frame; mounting a permanent magnet in fixed relationship with said redraw assembly; displacing said permanent magnet along said central longitudinal axis of said coil assembly by selective application of electrical current to said coil assembly.

BRIEF DESCRIPTION OF THE DRAWINGS

An illustrative and presently preferred embodiment of the invention is shown in the accompanying drawings in which:

FIG. 1 is a partially cross sectional, top plan view of a can body maker apparatus.

FIG. 2 is a side elevation view of the can body maker apparatus of FIG. 1.

DETAILED DESCRIPTION OF THE INVENTION

Prior Art Can Body Maker

Figure 3:
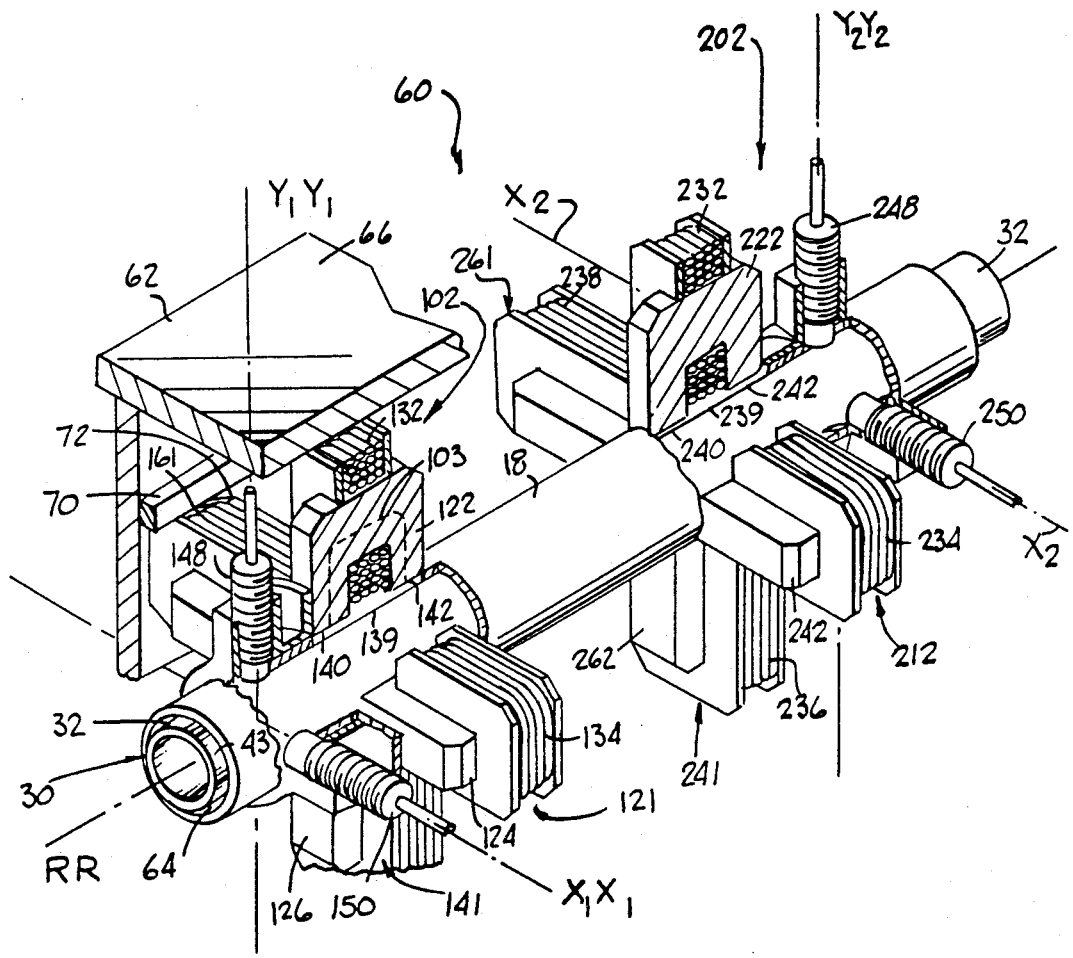
FIG. 3 is a perspective view of a ram magnetic bearing assembly.

The apparatus illustrated in FIGS. 8-15 corresponds to those illustrated in FIGS. 1-8 of U.S. Pat. No. 4,934,167 of Grims et al. incorporated by reference above. A frame 510 has a ram carriage 512 mounted thereon for reciprocating movement over a pair of spaced apart opposed way strips (not shown). The ram carriage 512 has a ram 514 mounted thereon so that during the forward stroke, the ram 514 will pass through the redraw apparatus 516, having a cup feeding means 517, and through the housing 518 containing the can forming and ironing dies similar to those in U.S. Pat. No. 3,735,629 to Paramonoff. The mechanism for reciprocating the ram carriage 512 includes the motor 520, the pulley wheel 522, the crank shafts 524, the crank arms 526, the crank pins 528, the main connecting rod 530 and cross-head members 532, all of which are conventional.

The redraw apparatus 602 of this apparatus is illustrated in FIGS. 8-12 and comprises a redraw carriage 540 having a conventional redraw sleeve 542. The redraw carriage 540 is provided with a pair of spaced apart longitudinally extending bores 544 and 546 which are located on both sides of bushing 548 mounted in the redraw carriage 540. One end of each bore 544 and 546 is enlarged and bearing means 550 and 552 are fixedly mounted therein. The bearing means 550 and 552 preferably comprise a hardened steel bushing having a cylindrical inner surface 554. The redraw carriage 540 is also provided with a pair of bores 556 in which are mounted rocker pivots 558 similar to those in the Maytag patent incorporated by reference above. The redraw carriage 540 also is provided with passageways 560. A rocker arm 562 similar to the one in the Maytag patent has extension 564 which extend through the passageways 560 and are pivotally mounted on the rocker pivots 558 to provide the force to reciprocate the redraw carriage 540.

A pair of spaced apart support posts 570 and 572 are fixedly mounted on the housing 518 holding the can forming and ironing dies (not shown). Each of the support posts 570 and 572 has a cylindrical outer surface 574 and has a longitudinal axis extending parallel to the longitudinal axis of the ram 514. The redraw carriage 540 is slidably mounted on the support posts 570 and 572 by placing the bearing means 550 and 552 over the support posts 570 and 572. Conventional fittings 576 are provided for supplying lubrication for the bearing means 550 and 552. This slidable mounting of the redraw carriage, as illustrated in FIGS. 8-12, is substantially friction-free and minimizes any wear caused by the reciprocating movement of the redraw carriage so that proper alignment of the redraw sleeve with the ram assembly and the housing holding the can forming and ironing dies is maintained.

Figure 8:
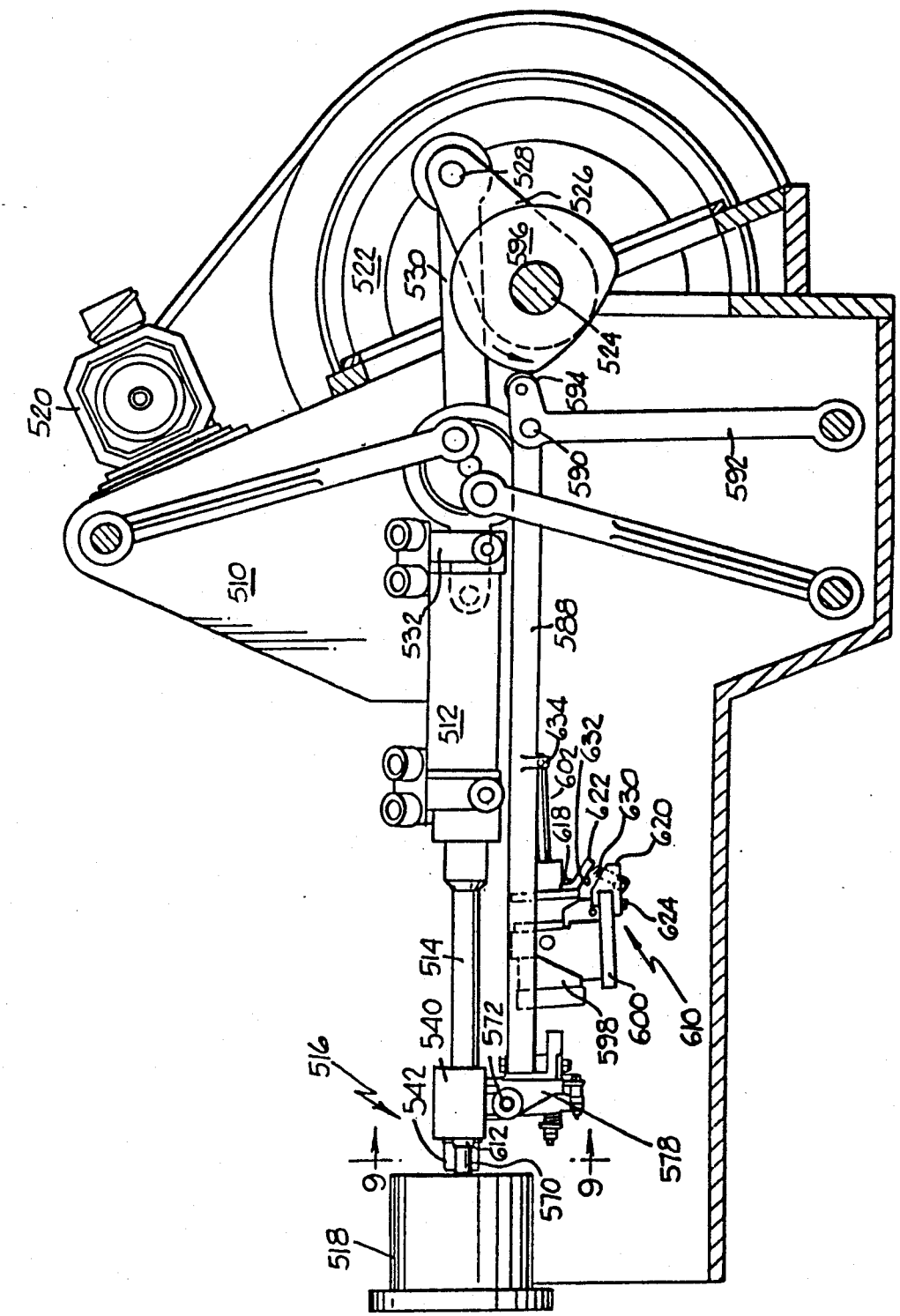
FIG. 8 is a side elevational view of a can bodymaking apparatus.
Figure 9:
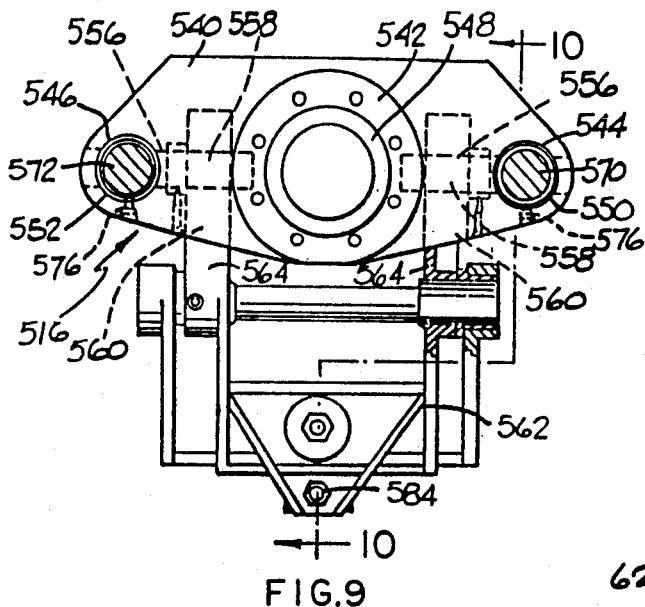
FIG. 9 is an elevational view with parts in section taken on the line 9—9 of FIG. 8.
Figure 12:
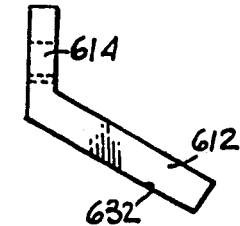
FIG. 12 is a side elevational view of a plate means forming a part of the counterbalancing means.
Figure 13:
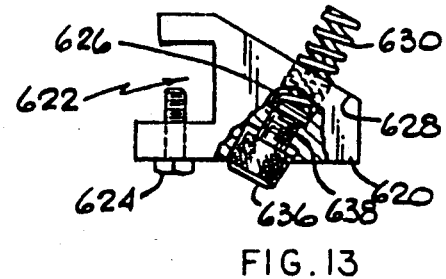
FIG. 13 is a side elevational view of the spring holding means of the counterbalancing means.
Figure 10:
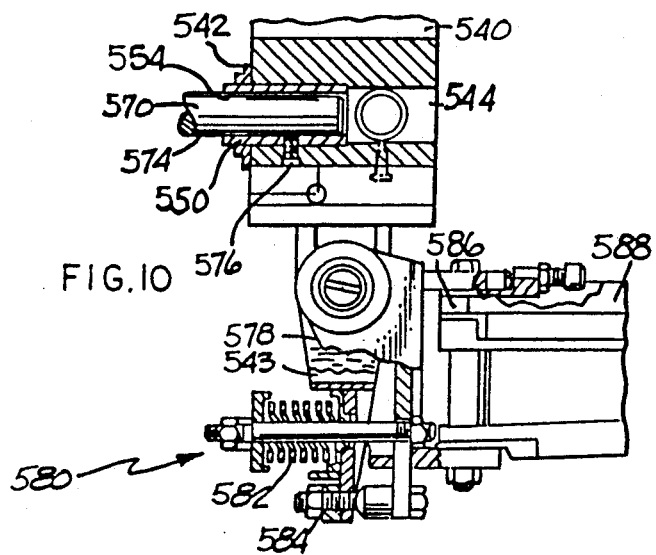
FIG. 10 is an elevational view with parts in section taken along the line 10—10 of FIG. 9.
Figure 14:
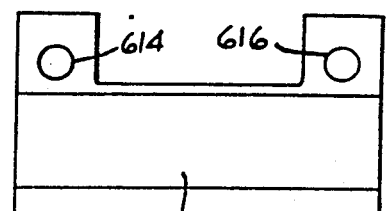
FIG. 14 is a front elevational view of FIG. 12.
Figure 11:
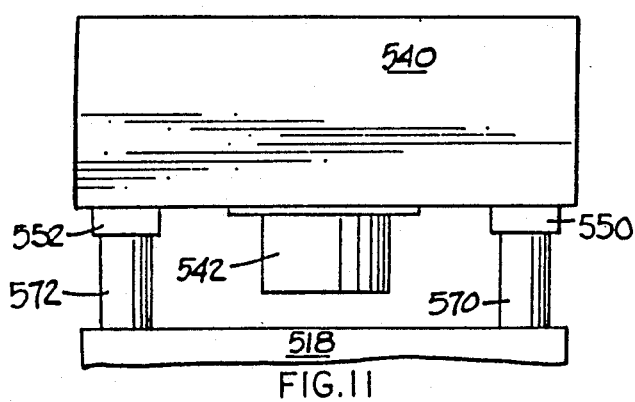
FIG. 11 is a top plan view of a portion of FIG. 9.
Figure 15:
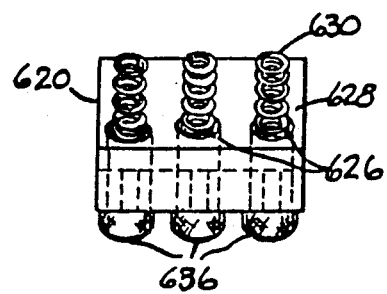
FIG. 15 is a front elevational view of FIG. 13.

The redraw carriage 540 is reciprocated by conventional mechanism as illustrated in FIGS. 8-10. The rocker arm 562 is attached to a shoe 578 which supports the conventional movement arresting means 80 including the spring 582 and 530 adjustable stop screw 584. The shoe 578 is attached to the end 586 of the actuating rod 588 and the end 590 of the actuating rod 588 is pivotally connected to the cam follower lever 592 having a can follower 594 which is urged against a cam 596 rotated by the wheel 522. An air cylinder 598 is mounted on a fixed support 600 with the free end of its piston rod 602 pivotally connected to the actuating rod 588 at approximately the mid-point thereof. The air cylinder 598 exerts a constant force on the actuating rod 588 through the piston rod 602 to maintain the cam follower 594 in contact with the cam 596 to provide the reciprocating movement to the redraw carriage 540.

A counterbalancing means 510, illustrated in FIGS. 8 and 12-15, is provided for applying a force on the redraw actuating bar 588 so as to substantially eliminate any weight on the redraw carriage 540. The counterbalancing means 610 comprises an angularly shaped member 612 having passageways 614 and 616 so that it may be secured by headed bolts 618 to the housing of the air cylinder 598. A support member 620 having a U-shaped opening 622 is positioned on the support 600 and secured thereto by a set screw 624. A plurality of holes 626 are formed in the support member 620 and extend partially therethrough and have openings in the upper surface 628 thereof. A coiled spring 630 is located in each hole. As illustrated in FIG. 8, the support member 620 is located relative to the member 612 so that the coiled springs 630 are in contact with a generally planar bottom surface 632 on the member 612. Pivot means 634 are provided for pivotally connecting the end of the piston rod 602 to the redraw actuating bar 588. This pivot means 634 is connected to the redraw actuating bar 588 at a generally central location. The coiled springs 630 function to provide a force on the member 612 so as to counterbalance the weight of the redraw actuating bar 588 and its associated structures so that there is substantially no weight placed on the redraw carriage 540. Set screws 636 are threadedly mounted in threaded bores 638 in the support member 620 so that the ends thereof are in contact with the coiled springs 630 so that the amount of force being applied by the coiled springs 630 may be adjusted. This counterbalancing means 610 virtually eliminates any wear of the bushing means 550 and 552 and the support posts 570 and 572 so that proper alignment of the redraw sleeve with the ram assembly and the housing holding the can forming and ironing dies is maintained.

The redraw carriage 540 and the redraw sleeve 542 are reciprocated over the support posts 570 and 572 to position a can blank (not shown) to be contacted by the ram 514 and be pushed through the can forming and ironing dies in the housing 518 to form a can body.

In General

FIG. 1 illustrates a can body maker apparatus 10 of the type having an axially reciprocal ram member 30 and a coaxially aligned redraw assembly 408 which is reciprocally displaceable independently of the ram member 30. A ram position sensing assembly 50, 148, 150, 248, FIG. 4, senses the position of the ram member and generates a ram position signal in response thereto. An electromagnetic bearing assembly 60 frictionlessly radially supports and aligns the ram member with a predetermined ram displacement path RR. A redraw carriage actuator 439 applies magnetic force to a redraw carriage 416 which produces the reciprocal motion of the redraw assembly. A control unit 130 generates data signals for selectively energizing and deenergizing electromagnets in the electromagnetic bearing assembly 60 and the redraw carriage actuator 439 in response to the ram position signal.

Ram Assembly

As illustrated in FIG. 1, can body maker 10 comprises a support frame 12 comprising a pair of spaced apart linearly extending support beams 16 in parallel relationship and having support legs (not shown) fixedly mounted on a floating support base 14 as is conventional in the art. A plurality of cross-beam members 18 extend between and are connected to the support beams 16 to provide a rigid support structure. A housing 20 having conventional can forming and ironing dies located therein is fixedly mounted on the support beams 16 by suitable means such as nuts and bolts.

An elongated ram 30 is provided and has a main body portion 32 having a generally cylindrical outer peripheral surface 34 and which is constructed from a magnetic material such as steel. The elongated ram 32 has a first end portion 36 for movement into a redraw assembly to contact a can blank (not shown) located therein and to move the can blank through conventional can forming and ironing dies (not shown) in the housing 20 to form an elongated can body (not shown). The elongated ram 30 has a second end portion 38 which is securely mounted in a connecting device 40.

Apparatus 42 extends from machinery, such as the straight line motion assembly described in detail in the above referenced Maytag and Grims et al. patents, which provides the apparatus 42 with a reciprocating linear motion. A connecting arm 44 is connected to the apparatus 42 and the connecting device 40 to transmit the reciprocating linear motion to the connecting device 40 and the elongated ram 30. Apparatus 42 receives motive force from a crankshaft 46, FIG. 4, which is connected by conventional mechanical linkage to an electric drive motor 48. An electronic encoder unit 50 is mounted on the crankshaft 46 and generates a pulse signal which is representative of crankshaft angular position. In one preferred embodiment an encoder is selected which generates 10,000 pulses per crankshaft revolution. The encoder may be either an incremental, absolute, or linear position indicator type as are commercially available in the industry. The encoder pulse signal is provided to a data processing device having a pulse counter which resets at the beginning of each new crankshaft revolution. The ram performs one ram stroke per crankshaft revolution. The encoder pulse count is thus representative of ram axial position.

A magnetic bearing assembly 60 is mounted in a support structure 62 which is mounted on the support beams 16 so as to hold the magnetic bearing assembly 60 at a fixed location. The magnetic bearing assembly 60, described in more detail below, has a generally cylindrical inner surface 64, FIG. 3, having a diameter slightly greater than the diameter of the generally cylindrical outer surface 34 to provide for sliding movement of the ram main body portion 32 through the magnetic bearing assembly. The difference in diameters between the generally cylindrical outer surface 34 and the generally cylindrical inner surface 64 is between about 0.005 and 0.015 inches. The elongated ram 30 during the reciprocation thereof is frictionlessly supported solely by the magnetic force provided by the magnetic bearing assembly 60.

The magnetic bearing support housing 62 is illustrated in FIGS. 1 and 3. The support housing 62 comprises an integral casting preferably formed from nonmagnetic material such as cast aluminum and has a pair of linearly extending beams 66 each having a generally planar bottom surface. Beams 66 abut and are attached to beams 16 of support frame 12. A plurality of reinforcing ribs 68 extend between and are integral with beams 66. An interior wall 70 of support housing 62 comprises a plurality of flange portions 72, etc., projecting therefrom which are adapted to be fixedly secured, as by attachment bolts, to various portions of the bearing assembly 60.

Magnetic bearing assembly 60 for frictionlessly supporting ram 30 main body portion 32 is illustrated in FIG. 3. The magnetic bearing assembly includes an elongated cylindrical sleeve 118 which comprises inner surface 64. A forward and a rear magnetic bearing, 102, 202 are provided by two sets of U-shaped stationary electromagnets 110, 112, 114, 116 and 210, 220, 224, 226 and position sensors 148, 150, and 248, 250 respectively are located at each end of sleeve 118 which may be 15 inches long.

Each set of electromagnets preferably consists of four electromagnets, e.g. 110, 112, 114, 116, located 90 degrees apart around the periphery of the sleeve 118 and are operable to generate four orthogonal magnetic fields 130 within the sleeve 118.

Each set of positions sensors, e.g. 148, 150, are aligned with associated electromagnets, e.g. 110, 112, to define two orthogonal horizontal $X_1X_1$, $X_2X_2$ and vertical $Y_1Y_1$, $Y_2Y_2$ axes from which signals proportional to orthogonal ram shaft displacement are provided. These signals are provided to a data processing unit 130, FIG. 4, which also receives the pulse signal from encoder 50.

Figure 4:
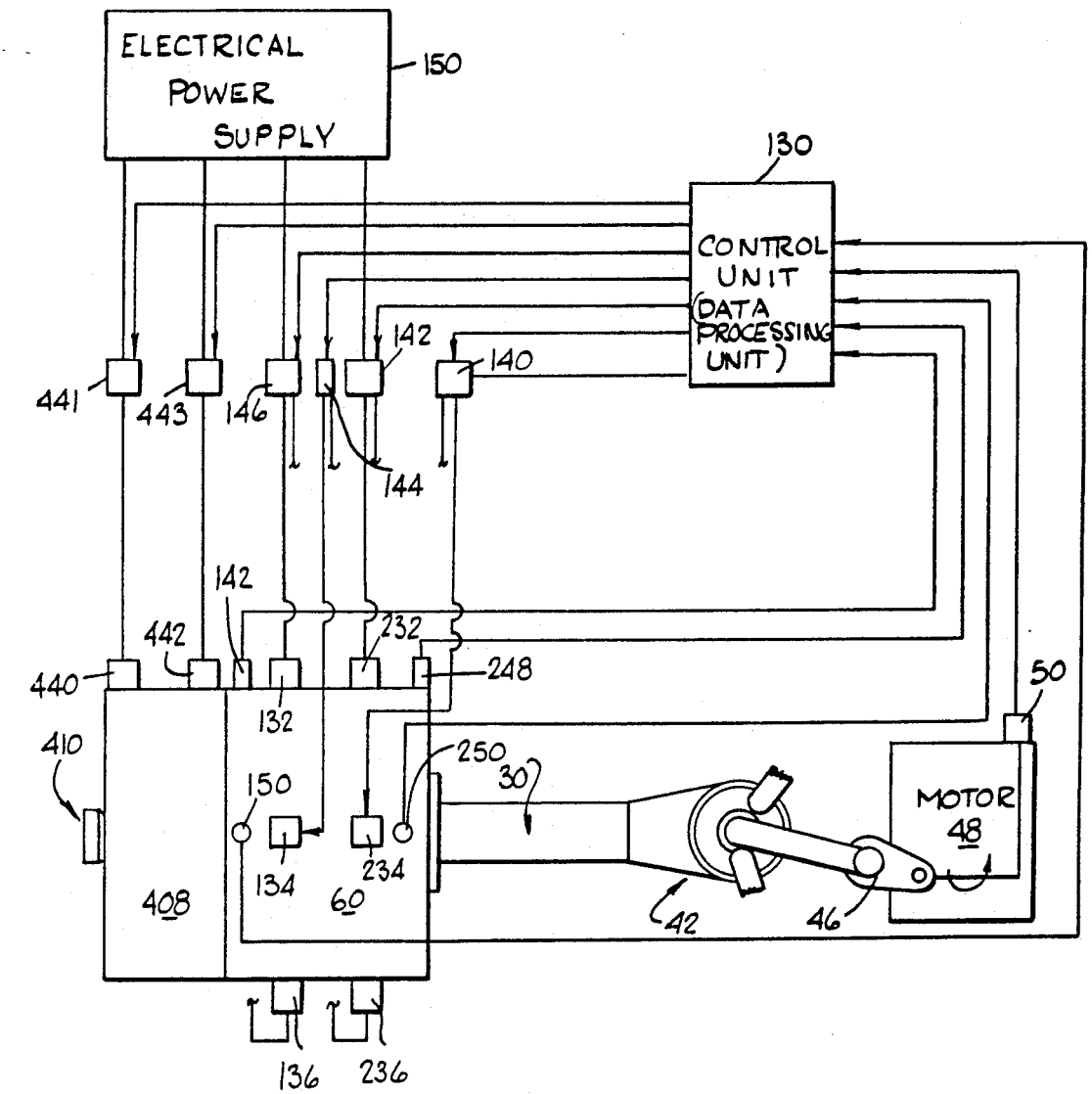
FIG. 4 is a schematic illustration of a control system for the ram and redraw assembly of the body maker apparatus of FIG. 1.

The data processing unit 130 issues control signals to control circuits 142, 144, 144, 146, FIG. 4, which controls the current flow from electric energy source 150 to each opposed set of electromagnets so as to energize the coil windings 132, 134, 136, 138 and 232, 234, 236, 238 for radially centering the elongated ram 30 within the sleeve 118. The electromagnets may be energized either in a linear fashion or in a pulsed manner as is well known in the art. In the preferred embodiment, pulsed energization is employed.

In one embodiment of the invention the data processing unit 130 generates control signals based solely on ram radial position as sensed by sensors 148, 150 248, 250. The data processing unit in this embodiment may comprise hard wired electronic components identical to those described in U.S. Pat. No. 4,473,259 of Goldowsky.

In a preferred embodiment of the invention which is presently the best mode contemplated, data processing unit 130 generates control signals based upon both ram radial position as sensed by sensors 148, 150 248, 250 and is also based upon ram axial position as indicated by encoder 50.

Figure 5:
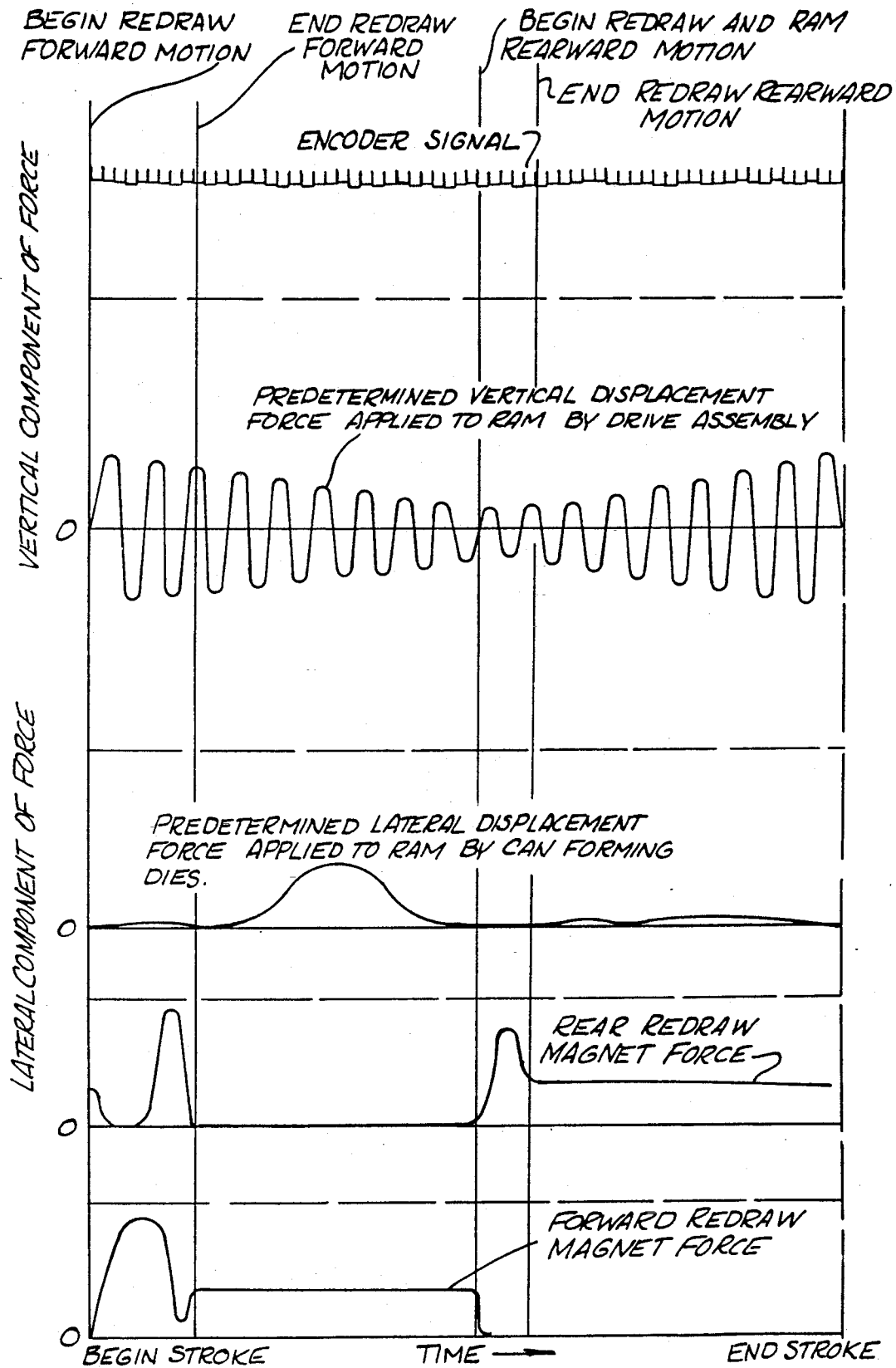
FIG. 5 is a graph illustrating typical vertical and lateral forces exerted on a bearing assembly by a ram.

As indicated in FIG. 5, encoder signal 300 comprises a set of signal pulses 302, 304, etc., which are indicative of the exact axial position of the ram 30 at any point in time. FIG. 5, also shows a force signal 310 which is typical of the total vertical force applied to a magnetic bearing e.g. 202 during a ram operating stroke. Forces which contribute to this total vertical force include a sinusoidal force applied by the ram drive apparatus 42 due to the fact that the linear motion assembly always has a small component of nonlinear force on apparatus 42. This force and also the force attributable to the weight of the ram 30 itself vary in magnitude during the ram stroke due to the changing length of the moment arm associated with each of these forces during a ram stroke. However, these components of the total vertical force exerted on the magnetic bearing are cyclical and under normal operating conditions represent substantially all of the vertical force which will be exerted on the magnetic bearing. This force may be empirically determined using conventional strain gages and/or other means and may be stored as a function of ram axial position in a conventional electronic storage medium such as the RAM of a conventional microcomputer which may comprise a portion of the data processing unit 50.

FIG. 5 further illustrates at 350 the total lateral side loading force which may typically be exerted on electromagnet bearing 202 by ram 30. The short interval large magnitude force indicated at 352 is primarily due to a side force experienced at the end of ram 30 as it moves through the can forming dies. This relatively large magnitude force is cyclical and, like the cyclical vertical force, may also be empirically determined and stored as a function of ram axial position.

There are various forms in which the data represented by curves 310 and 350 may be stored which enables the force value associated with a particular ram position to be readily determined, e.g. in computer look up table form or as a mathematical formula derived by conventional curve matching techniques. As used herein the process of obtaining a force value from this predetermined correlated and stored information representative of ram axial position and associated force will be referred to as "applying a predetermined algorithm" to the ram axial position value regardless of whether the data is stored as a mathematical equation, in a look up table or in any other readily retrievable form.

Since the solid lines 310 350 represent the force applied to a magnetic bearing by the ram during a normal ram stroke it will of course be necessary for the bearing assembly to apply an identical amount of force to the ram 30 at the corresponding axial positions in order to maintain the ram in a centered position in the bearing. Accordingly in one preferred embodiment of the invention the data processing means, which may comprise a conventional microprocessor, at predetermined intervals, e.g. every 5 milliseconds, reads the encoder count and applies a predetermined algorithm thereto based upon the empirically determined force relationship e.g. 310 in order to determine the force to be applied and then provides a control signal to the control circuitry for the associated opposed pairs of magnets e.g. 232, 236, which causes the magnets to apply the determined force to the ram. It will of course be appreciated that in implementing this method of control a separate force/axial position algorithm is determined and stored for use in association with each opposed pair of electromagnets.

In addition to determining a first (primary) force signal based for each opposed pair of electromagnets based upon a stored axial position/force algorithm as described above, the data processing unit 130 may also determine a second (secondary) force signal based upon the radial position of the portions of the ram 30 sensed by sensors 148, 150 and 248, 250. Thus in addition to the primary force signal provided for each opposed magnet pair a secondary signal is also generated for each magnet pair which is added to the primary signal to provide a resultant signal which is used to determine the force applied by the magnet pair. This secondary signal may be generated in a manner identical to that described in the Goldowsky patent. Alternatively, this secondary force signal may be generated through the use of a predetermined algorithm which is stored in computer software and which is applied to the raw sensor signal generated by an associated radial position sensor.

As a further means of control data representative of the each radial position sensor signal value as a function of ram axial position is accumulated and stored for at least one and preferably about 20 previous ram strokes. This stored data is then processed and used to adjust the predetermined algorithm, e.g. 310, which is used to determine the primary force signal which is applied by an opposed magnet pair to the ram 30. Using this further means of control the primary control algorithm may be periodically modified to account for changing conditions, such as heating and cooling of machine components, which may effect the force which must be exerted on the ram to maintain it in a centered position during all phases of the stroke. Using this further means of control it may be possible to determine the primary control algorithm e.g. 310 for each opposed set of electromagnets, e.g. 232, 236, by starting with a straight line primary algorithm and simply running the apparatus. During initial stages of operation most of the control would be provided by the secondary control signal. As the number of operating cycles progress the primary control algorithm, through periodic adjustment would become more and more representative of the actual total control force required and would thus require progressively less adjustment by the secondary control force signal.

Figure 6:
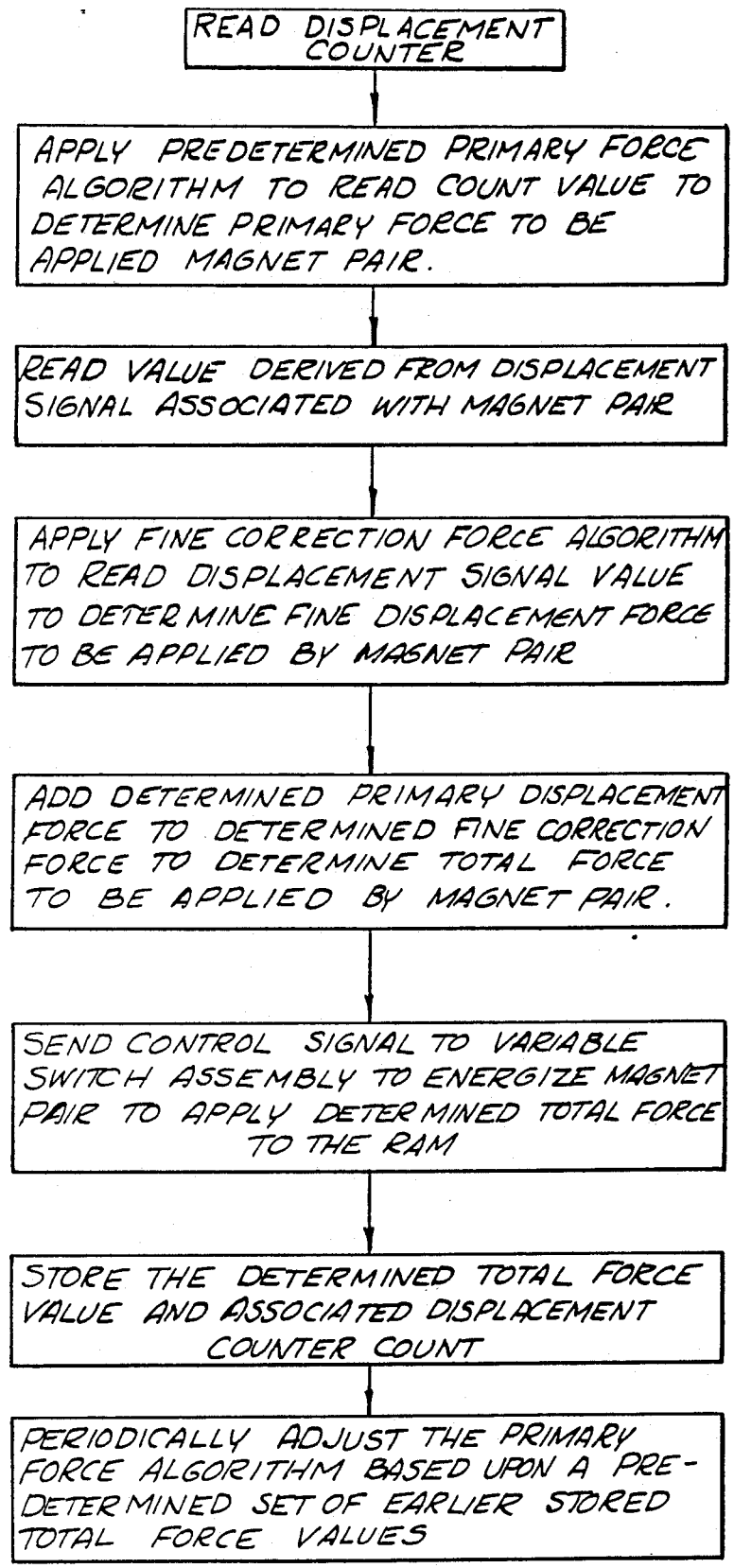
FIG. 6 is a block diagram illustrating the operation of a portion of the control system of FIG. 4.
Figure 7:
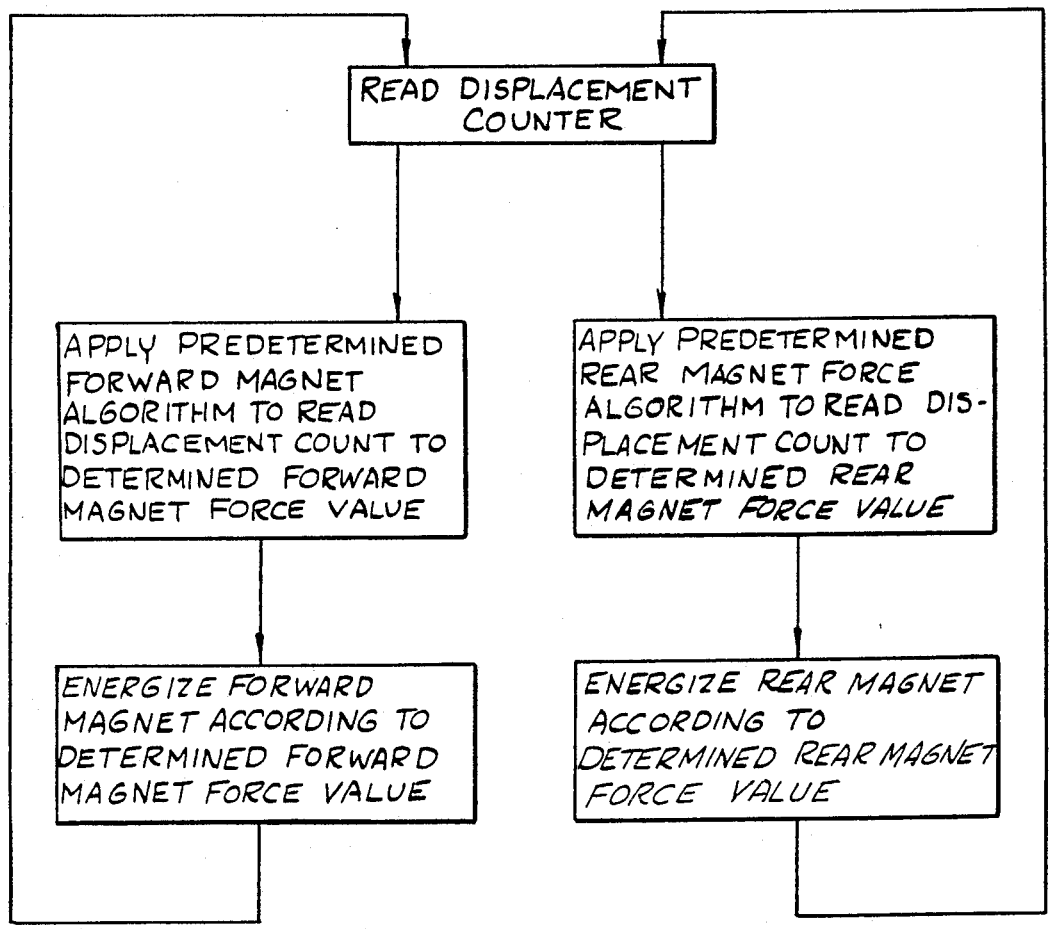
FIG. 7 is a block diagram illustrating the operation of another portion of the control system of FIG. 4.

The above described control method which provides a total control force signal based upon a primary force signal and a modifying secondary force signal and wherein an algorithm used to generate the primary force signal is periodically modified based upon a ram radial displacement signal is illustrated in block diagram form in FIG. 6. It will of course be understood that the method illustrated in FIG. 6 is described for a single pair of opposed electromagnets and that an identical process will be performed for each of the opposed pair of magnets at each sampling interval of the data processing means.

Redraw Assembly

As best illustrated in FIG. 1 redraw assembly 408 comprises a redraw sleeve 410 which is coaxial with ram displacement axis RR. Redraw sleeve 410 has a central cylindrical cavity extending therethrough which is adapted to slidingly receive ram member 30 therethrough. The general sequence of reciprocal motion of redraw sleeve with respect to the motion of ram 30 is as described in the above referenced Maytag patent.

The redraw sleeve 410 comprises a forward end 410 which is adapted to receive a can body preform known as a cup (not shown) thereon. The redraw sleeve comprises a rear end 414 which is fixedly secured to a redraw carriage 416.

The redraw carriage has a first and second bushing 416, 418 mounted therein which are adapted to slide on post members 422, 424. The post members have rear end portions which are fixedly mounted on a forward portion of ram bearing housing 62 and which have forward end portions which are fixedly mounted on redraw support bracket 430 which is itself attached to the ram housing 62.

A redraw actuator assembly 439 is fixedly supported by the support bracket 430. The actuator assembly comprises a forward ring shaped electromagnet 440 positioned forwardly of the redraw carriage and defining the forwardmost travel position of the redraw carriage. The actuator assembly also comprises a rear ring shaped electromagnet 442 positioned rearwardly of the redraw carriage and defining the rearwardmost travel position of the redraw carriage.

As illustrated in FIG. 4, the forward and rear redraw magnets 440, 442 are energized and deenergized in response to control signals generated by data processing unit 130. As shown by FIG. 4 and the block diagram of FIG. 7, the data processing means generates control signals which are sent to control circuits 441, 443 to energize or deenergize electromagnets 440, 442. The control signals are generated in response to ram 30 position as determined by the pulse signal from encoder 50. The control signal for each electromagnet 440, 442 is generated by applying a predetermined algorithm to the ram position signal. The algorithm which is applied may be determined analytically or empirically. The resulting force applied by each of the electromagnets causes the redraw carriage to begin moving forwardly at the beginning of each ram stroke. The forward movement of the redraw carriage is sufficiently fast such that the cup carried by the redraw sleeve it moved into engaged position with the tool pack housing 20 prior to the arrival of the ram 30. However the redraw carriage must decelerate sufficiently prior to housing 20 engagement such that there is relatively little rebound at engagement. FIG. 5, illustrates a typical force profile for obtaining such a result. The electromagnets are energized and deenergized in a similar manner to return the redraw carriage to its rearmost position at approximately the same time that the ram 30 begins its rearward travel.

As shown in FIG. 5, a clamping force is applied by the forward redraw magnet 440 to maintain the redraw sleeve in stationary relationship with the abutment surface 19 of the forming die housing 18 after the redraw sleeves forward motion has ended. This redraw clamping force may be a variable force as illustrated in FIG. 5 by the small increase in force which occurs immediately after the point in time where the redraw forward motion ends.

It will be appreciated from the above description that the forward redraw electromagnet 440 may act both as a means for displacing the redraw carriage and also as a means for applying a clamping force to maintain the can preform carried on the redraw sleeve in abutting contact with abutment surface 19 of housing 20. The electromagnet 440 could also be used exclusively for applying clamping force with the force used to displace the redraw carriage being provided by a conventional mechanical drive assembly such as in the prior art body maker described below with reference to FIGS. 8–15.

Alternative Redraw Actuator Assembly

Figure 16:
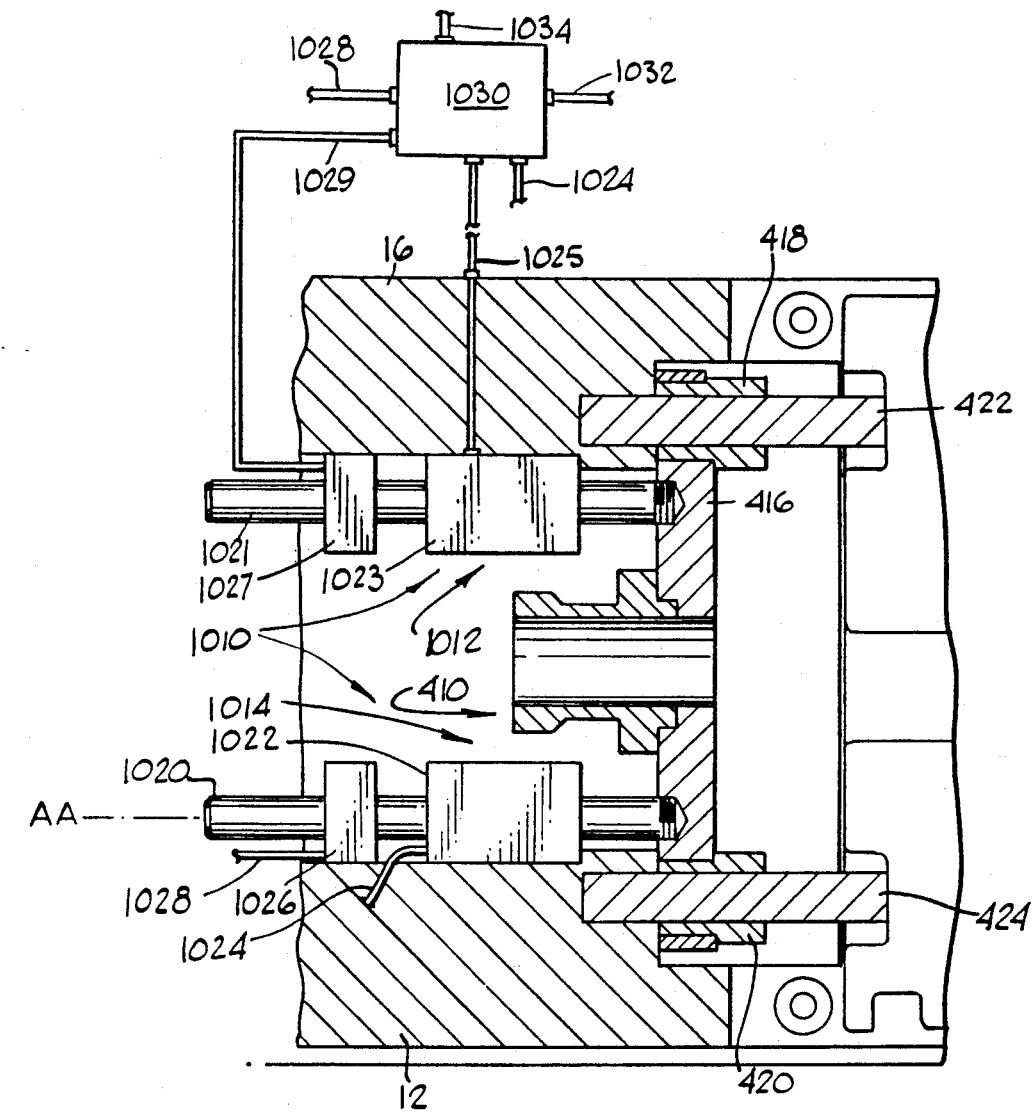
FIG. 16 is a partially cross-sectional top plan view of an alternative embodiment of a can body maker redraw assembly which is provided in a can body maker of the type illustrated in FIGS. 1 and 2.

FIG. 16 illustrates a redraw portion of a can body maker which may be identical to the redraw assembly illustrated in FIGS. 1 and 2, except that an alternative redraw actuator assembly 1010 replaces the redraw actuator assembly 439 shown in FIG. 1. The alternative redraw actuator assembly illustrated in FIG. 16 comprises a first and second redraw actuator unit 1012, 1014 associated with opposite lateral sides of the redraw carriage 416. The construction of each of the actuator units 1012, 1014 is preferably identical.

Actuator unit 1014 comprises a shaft 1020 which is fixedly attached to one lateral side of the redraw carriage 416 as by threading attachment, welding, or other conventional attachment means well-known in the art. The shaft 1020 has a central longitudinal axis AA which is parallel to the path of reciprocal movement of redraw sleeve 410. Shaft 1020 passes through an electromagnet assembly 1022 which is energized with electricity provided through electrical cable 1024. The electromagnet assembly 1022 is fixedly mounted on a frame portion 12 of the body maker. Shaft 1020 is longitudinally displaceable with respect to electromagnet assembly 1022. A shaft position sensor 1026 is also fixedly mounted on body maker frame 12. Shaft 1020 is longitudinally displaceably received therethrough. Position sensor 1026 may comprise a linear voltage differential transformer of a type well-known in the art such as disclosed in Horowitz, P. and Hill, W., *The Art of Electronics,* Cambridge University Press (1980), pp. 602–603; which is hereby specifically incorporated by reference. The shaft position sensor generates a signal indicative of the longitudinal position of shaft 1020 which is transmitted through electrical cable 1028 to redraw controller unit 1030.

Actuator unit 1012 comprises a shaft 1021, electromagnet assembly 1023 with cable 1025, and shaft position sensor 1027 with cable 1029 which may be identical to corresponding components of actuator unit 1014.

Redraw controller unit 1030 receives signals through cables 1028 and 1029 connected to shaft position sensors 1026 and 1027 indicative of the position of redraw actuator shafts 1020 and 1021 and also receives a signal indicative of ram 30 position, e.g. a signal from ram drive encoder unit 50 via cable 1032. The controller receives electrical power through power cable 1034. The redraw actuator shaft and ram shaft position signals are processed by the controller according to one or more predetermined control algorithms which determine the amount and direction of electric current which is supplied to the electromagnetic coils of units 1022, 1023.

Figure 17:
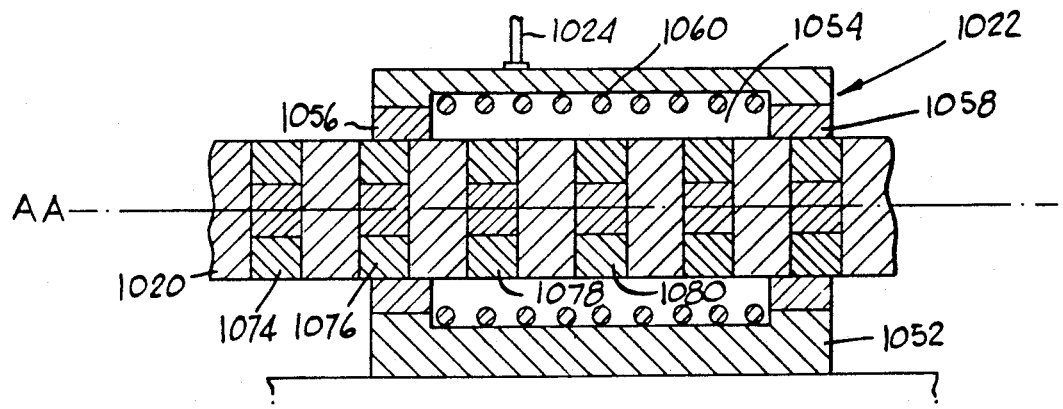
FIG. 17 is a cross-sectional top plan view of a redraw actuator unit of the alternative redraw assembly illustrated in FIG. 16.

As illustrated in FIG. 17, electromagnetic assembly 1022 may comprise a rigid, box-shaped housing 1052 which is fixedly attached to support frame 12. The housing 1052 defines an interior cavity 1054 having openings at front and rear portions thereof in which are mounted ram receiving bearings 1056 and 1058. An electrical coil 1060 helically wound about a central coil axis which is coaxial with shaft 1020 axis AA is provided near the outer periphery of housing interior cavity 1054. The electrical coil 1060 receives electrical energy through cable 1024.

Shaft 30 is constructed from a nonmagnetic material. A plurality of ring magnets 1074, 1076, 1078, 1080 having an outer diameter equal to that of shaft 1020 are fixedly mounted in recessed portions of shaft 1020 in axially spaced relationship as shown in FIG. 17. The magnetic field produced by coil 1060 coacts with the ring magnets 1074, 1076, etc. to produce an axial force on shaft 1020 which is dependent upon the amount and direction of current through the coil 1060. Coaction between an electromagnetic coil and permanent magnet to produce an axially directed force is described in U.S. Pat. Nos. 4,912,343; 4,892,328; and 4,814,732; each of which is hereby specifically incorporated by reference for all that is disclosed therein.

Figure 18:
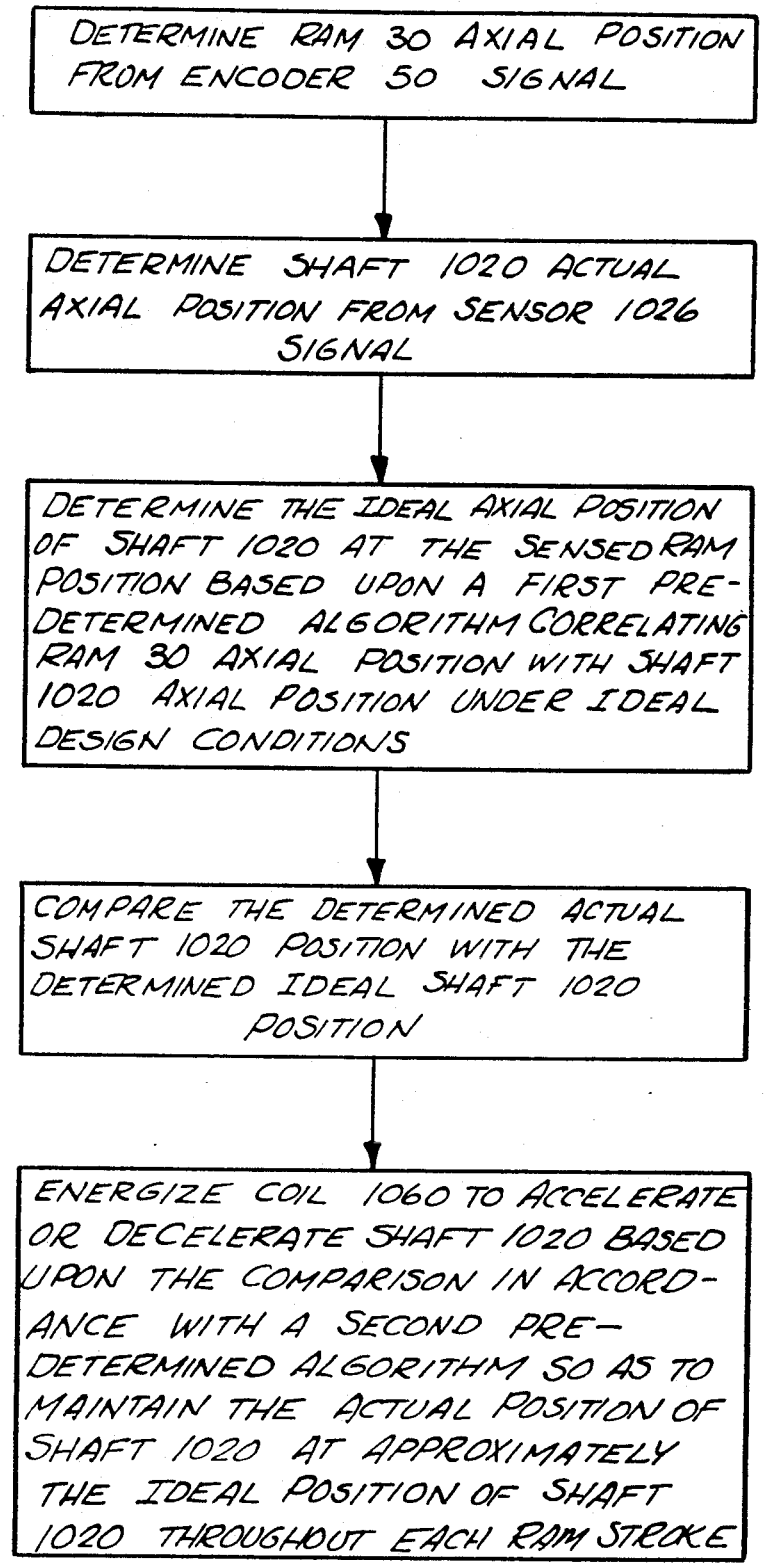
FIG. 18 is a block diagram illustrating one manner by which the position of a redraw carriage shaft is controlled based upon the position of a body maker ram.

The controller 1030 controls the position of redraw carriage shaft 1020 based upon the axial position of ram 30. The manner for controlling shaft 1021 is identical and thus will not be described. The block diagram of FIG. 18 indicates a typical control process which may take place during each sampling interval associated with ram 30 axial movement. Typically, there may be on the order of one sampling interval per millisecond.

Initially, the controller 1030 receives and processes a signal from ram encoder unit So to determine the precise axial position of the ram. Next, the controller 1030 receives and processes the signal from sensor 1026 to determine the actual axial position of redraw carriage shaft 1020. Next, the controller 1030 determines the "ideal" axial position of shaft 1020 for the sensed ram axial position based upon a first predetermined algorithm. The first predetermined algorithm correlates ram position and shaft 1020 position during an "ideal" ram stroke in which the position of the redraw carriage at any particular point during the ram stroke is at the exact position intended by the body maker designer. This algorithm may be stored as a mathematical expression or may be stored as a series of correlated data points, etc.

After the ideal axial position of shaft 1020 is determined, this ideal position is compared with the actually sensed position of shaft 1020. Next, based upon this comparison, coil 1060 is energized in the appropriate manner to accelerate or decelerate shaft 1020 to relatively move it in the direction of the ideal ram position. The amount of such acceleration produced on shaft 1020 is a function of the direction and amount of current flowing through coil 1060. The actual amount of current which is supplied is determined based upon a preset control algorithm which utilizes the comparison of shaft 1020 ideal and actual position as an input. The control algorithm may take into account the velocity and acceleration of both ram 30 and shaft 1020, their relative positions in the operating cycle, and/or other variables.

Figure 19:
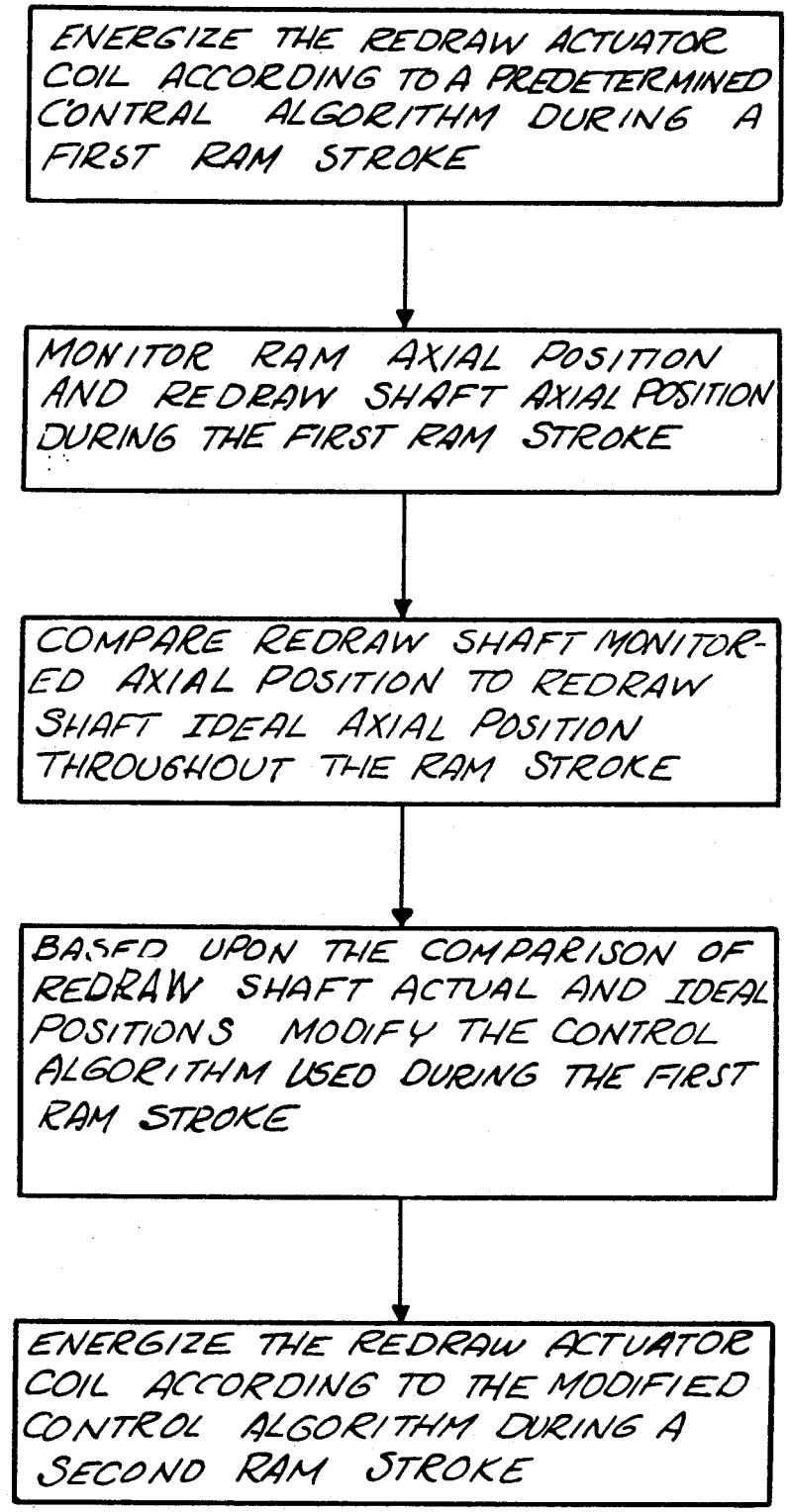
FIG. 19 is a block diagram illustrating an alternative control method to that indicated in FIG. 18.

In an alternative control method as illustrated in FIG. 19, the controller 1030 is provided with a data set indicative of the ideal redraw shaft position associated with each incremental ram position during an ideal operating stroke. Such data set will be referred to herein as the "ideal redraw/ram profile".

During a first actual operating stroke, the redraw actuator coil is energized according to a predetermined control algorithm which is adapted to nominally provide the ideal redraw profile. The actual redraw shaft axial position is monitored as a function of ram axial position during the first ram stroke and is stored as a data set which will be referred to herein as an "actual redraw/ram profile".

Next, this actual redraw/ram profile is compared with the ideal redraw/ram profile by controller 1030.

Next, based upon this comparison of actual and ideal redraw/ram profiles, the control algorithm used during the first ram stroke is modified so as to more accurately energize the redraw actuator coil to produce the ideal redraw/ram profile. This same process again takes place during the second ram stroke, and the control algorithm used in the second stroke is modified at the end of the second stroke and used to control coil energization during the third stroke, etc. In a modified embodiment of this control scheme, the actual redraw shaft displacement as a function of ram movement during several previous ram strokes may be averaged or otherwise collectively used and compared to the ideal redraw/ram profile to provide a basis for modifying the control algorithm. In other words, modification of the control algorithm may take place after several operating strokes, as opposed to after every single operating stroke.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. Can body making apparatus for forming can blanks into elongated can bodies comprising:
   a stationary support frame;
   a housing having forming and ironing dies located therein mounted on said support frame;
   an elongated ram having a first end portion and a second end portion, said first end portion having an outer surface adapted for movement into a redraw assembly to contact a can blank in said redraw assembly and to move said can blank out of said redraw assembly and through said forming and ironing dies to form an elongated can body;
   reciprocating drive means for providing reciprocating axial displacement for said elongated ram; and
   a redraw assembly located adjacent to said housing, wherein said redraw assembly comprises:
      a redraw sleeve for supporting a can body preform thereon;
      redraw carriage means for supporting and axially displacing said redraw sleeve relative said elongated ram;
      redraw electromagnetic coil means fixedly positioned relative said stationary support frame and having a central coil axis for selectively providing an electromagnetic field;
      permanent magnet means fixedly mounted with respect to said redraw carriage means in displaceable relationship with said coil means along said central coil axis for coacting with said coil means for controllably reciprocatingly displacing said redraw carriage means.

2. The invention of claim 1 further comprising redraw control means comprising:
   ram position sensing means for sensing the axial position of said ram and generating a ram axial position signal indicative thereof; and
   data processing means for receiving said ram position signal and for generating a control signal in response thereto for energizing and deenergizing said redraw electromagnetic coil means.

3. The invention of claim 1 further comprising:
   redraw carriage position sensing means for sensing the axial position of said redraw carriage means and generating a redraw axial position signal indicative thereof;
   data processing means for receiving said redraw axial position signal and for generating a control signal in response thereto for energizing and deenergizing said redraw electromagnetic coil means.

4. The invention of claim I further comprising:
   ram position sensing means for sensing the axial position of said ram and generating a ram axial position signal indicative thereof;
   redraw carriage position sensing means for sensing the axial position of said redraw carriage means and generating a redraw axial position signal indicative thereof;
   data processing means for receiving said ram and said redraw axial position signals and for generating a control signal in response thereto for energizing and deenergizing said redraw electromagnetic coil means.

5. The invention of claim 3 wherein said redraw carriage position sensing means comprises a linear voltage differential transformer.

6. The invention of claim 4 wherein said redraw carriage position sensing means comprises a linear voltage differential transformer.

7. In a can body maker apparatus of the type having a stationary support frame; a ram assembly which is reciprocatingly displaceable relative the support frame and a redraw assembly which is reciprocatingly displaceable relative the support frame, a method of reciprocating the redraw assembly comprising the steps of:

mounting a magnetic coil assembly having a central longitudinal axis in fixed relationship with said support frame;

mounting a permanent magnet in fixed relationship with said redraw assembly;

displacing said permanent magnet along said central longitudinal axis of said coil assembly by selective application of electrical current to said coil assembly.

8. The method of claim 7 comprising the further steps of:

monitoring the axial position of the redraw assembly; and controlling the application of electrical current to said coil assembly based upon the axial position of the redraw assembly.

9. The method of claim 7 comprising the further steps of:

monitoring the axial position of the redraw assembly;

monitoring the axial position of the ram assembly;

controlling the application of electrical current to said coil assembly based upon the axial position of the redraw assembly and the axial position of the ram assembly.

10. A method of maintaining a reciprocating ram of a can body maker apparatus in alignment with a predetermined linear reciprocation axis comprising the steps of:

mounting a plurality of separately energizable electromagnets in an annular arrangement about a first predetermined axial portion of said linear reciprocation axis;

selectively energizing said electromagnets so as to urge a portion of said ram which is circumscribed by said plurality of electromagnets into coaxial relationship with said reciprocation axis;

sensing the position of said ram and generating a position signal indicative thereof and wherein the step of selectively energizing said electromagnets comprises energizing said electromagnets responsive to said position signal;

wherein the step of sensing the position of said ram and generating a position signal indicative thereof comprises the step of sensing the axial position of said ram and generating a ram axial position signal indicative thereof.

11. The method of claim 10 wherein the step of sensing the axial position of said ram comprises sensing the rotary position of a rotating component of said body maker.

12. The method of claim 10 wherein the step of energizing said electromagnets responsive to said position signal comprises energizing said electromagnets in accordance with a first predetermined algorithm which is function of ram axial position.

13. The method of claim 12 wherein the step of determining said algorithm based upon the radial loading of said ram during an operating stroke of said body maker.

14. The method of claim 12 wherein the step of sensing the position of said ram and generating a position signal indicative thereof also comprises the step of sensing the radial position of said ram and generating a ram radial position signal indicative thereof and wherein the step of energizing said electromagnets responsive to said position signal also comprises energizing said electromagnets in accordance with a second predetermined algorithm which is a function of ram radial position.

15. The method of claim 14 comprising the further steps of:

storing data representative of said ram radial position signal as a function of ram axial position from at least one previous ram stroke;

using said stored data to modify said first predetermined algorithm.

16. Can body making apparatus for forming can blanks into elongated can bodies comprising:

a stationary support frame;

a housing having forming and ironing dies located therein mounted on said support frame;

an elongated ram having a first end portion and a second end portion, said first end portion having a generally cylindrical outer surface for movement into said redraw assembly to contact a can blank in said redraw assembly and to move said can blank out of said redraw assembly and through said forming and ironing dies to form an elongated can body, said first end portion being constructed at least partially from magnetic material;

reciprocating drive means for providing reciprocating axial displacement for said elongated ram;

connecting means on said ram second end portion for connecting said elongated ram to said reciprocating drive means; and magnetic bearing means mounted on said support frame for radially centering and frictionlessly supporting said ram first end portion during reciprocating axial displacement of said ram wherein said magnetic bearing means comprises:

a first magnetic bearing assembly comprising a first set of separately energizable, circumferentially arranged electromagnets located at a first fixed position along the path of reciprocating displacement of said elongated ram; and a second magnetic bearing assembly comprising a second set of separately energizable, circumferentially arranged electromagnets located at a second fixed position along the path of reciprocating displacement of said elongated ram in spaced apart, coaxial relationship with said first magnetic bearing assembly;

further comprising magnetic bearing means control means comprising:

ram position sensing means for sensing the position of said ram and generating a ram position signal indicative thereof; and data processing means for receiving said ram position sensing signal and for generating a control signal in response thereto for energizing and deenergizing said first and second sets of electromagnets;

wherein said ram position sensing means comprises ram radial position sensing means;

wherein said ram position sensing means comprises ram axial position sensing means.

17. The invention of claim 16 wherein said data processing comprises means for applying a first algorithm to said ram axial position sensing means for generating a primary control signal for energizing and deenergizing said electromagnets.

18. The invention of claim 17 wherein said data processing comprises means for applying a second algorithm to said ram radial position sensing means for generating a primary control signal for energizing and deenergizing said electromagnets.

19. The invention of claim 18 wherein said data processing comprises means for applying a second algorithm to said ram radial position sensing means for generating a secondary control signal which is added to said primary control signal for energizing and deenergizing said electromagnets.

20. The invention of claim 19 further comprising data storage means for storing data representative of ram radial position and ram axial position during at least one previous ram stroke.

21. The invention of claim 20 wherein said data processing means comprises means for adjusting said first algorithm in accordance with said stored data representative of ram radial position and ram axial position during at least one previous ram stroke.

22. Can body making apparatus for forming can blanks into elongated can bodies comprising:
 a stationary support frame;
 a housing having forming and ironing dies located therein mounted on said support frame;
 an elongated ram having a first end portion and a second end portion, said first end portion having a generally cylindrical outer surface for movement into said redraw assembly to contact a can blank in said redraw assembly and to move said can blank out of said redraw assembly and through said forming and ironing dies to form an elongated can body, said first end portion being constructed at least partially from magnetic material;
 reciprocating drive means for providing reciprocating axial displacement for said elongated ram;
 connecting means on said ram second end portion for connecting said elongated ram to said reciprocating drive means; and
 magnetic bearing means mounted on said support frame for radially centering and frictionlessly supporting said ram first end portion during reciprocating axial displacement of said ram;
further comprising a redraw assembly located between said housing and said magnetic bearing and wherein said redraw assembly comprises:
 a redraw sleeve for supporting a can body preform thereon;
 redraw carriage means for supporting and axially displacing said redraw sleeve relative said elongated ram;
 first redraw electromagnet means fixedly positioned relative said stationary support frame at a location forward of said redraw carriage means for urging said redraw carriage means forwardly during an energized state thereof;
 second redraw electromagnet means fixedly positioned relative said stationary support frame at a location forward of said redraw carriage means for urging said redraw carriage means forwardly during an energized state thereof.

23. The invention of claim 22 further comprising redraw electromagnet control means comprising:
 ram position sensing means for sensing the axial position of said ram and generating a ram axial position signal indicative thereof; and
 data processing means for receiving said ram position signal and for generating a control signal in response thereto for energizing and deenergizing said first and second redraw electromagnet means.

24. The invention of claim 23 wherein said redraw carriage means is slidably mounted on post member fixedly attached to a forward portion of said magnetic bearing means.

25. Can body making apparatus for forming can blanks into elongated can bodies comprising:
 a stationary support frame;
 a housing having forming and ironing dies located therein mounted on said support frame;
 an elongated ram having a first end portion and a second end portion, said first end portion having an outer surface adapted for movement into a redraw assembly to contact a can blank in said redraw assembly and to move said can blank out of said redraw assembly and through said forming and ironing dies to form an elongated can body;
 reciprocating drive means for providing reciprocating axial displacement for said elongated ram; and
 a redraw assembly located adjacent to said housing, wherein said redraw assembly comprises:
 a redraw sleeve for supporting a can body preform thereon;
 redraw carriage means for supporting and axially displacing said redraw sleeve relative said elongated ram;
 redraw electromagnet means fixedly positioned relative said stationary support frame for providing axial force for reciprocally moving said redraw carriage means forwardly and rearwardly.

26. The invention of claim 25 wherein said redraw electromagnet means comprises:
 first redraw electromagnet means fixedly positioned relative said stationary support frame at a location forward of said redraw carriage means for urging said redraw carriage means forwardly during an energized state thereof;
 second redraw electromagnet means fixedly positioned relative said stationary support frame at a location forward of said redraw carriage means for urging said redraw carriage means forwardly during an energized state thereof.

27. The invention of claim 25 further comprising redraw electromagnet control means comprising:
 ram position sensing means for sensing the axial position of said ram and generating a ram axial position signal indicative thereof; and
 data processing means for receiving said ram position signal and for generating a control signal in response thereto for energizing and deenergizing said redraw electromagnetic coil means.

28. A can body maker apparatus comprising:
 an axially reciprocal ram member;
 an axially reciprocal redraw sleeve assembly;
 can forming dies separated from the redraw sleeve assembly by an abutment surface;
 electromagnetic clamping means for holding said redraw sleeve assembly at a stationary position adjacent said abutment surface; and
 said redraw sleeve assembly comprising a redraw carriage which is reciprocally displaceable relative said abutment surface, said electromagnetic clamping means comprising an electromagnet stationarily mounted with respect to said abutment surface for magnetically coacting with said redraw carriage.

29. The invention of claim 28 comprising:
 control means for energizing and deenergizing said electromagnetic clamping means.

30. The invention of claim 29 said control means comprising:

ram sensing means for sensing the axial position of said ram member and generating a signal in response thereto; and clamping means actuation means for actuating said electromagnetic clamping means in response to said ram sensing means signal.

31. The invention of claim 30 said ram sensing means comprising an electronic encoder unit mounted on a rotating element of a drive motor drivingly associated with said ram member.

32. The invention of claim 30 further comprising redraw assembly drive means for reciprocatingly driving said redraw sleeve assembly between an axial position adjacent said abutment surface and an axial position remote from said abutment surface, said redraw assembly drive means comprising electromagnetic drive means actuated in response to the axial position of said ram member.

33. The invention of claim 28, said electromagnetic clamping means comprising means for applying selectively variable clamping force to said redraw sleeve assembly.

34. The invention of claim 28 further comprising redraw assembly drive means for reciprocatingly driving said redraw sleeve assembly between an axial position adjacent said abutment surface and an axial position remote from said abutment surface.

35. The invention of claim 34 said redraw assembly drive means comprising mechanical drive means.

* * * * *

UNITED STATES PATENT AND TRADEMARK OFFICE
CERTIFICATE OF CORRECTION

PATENT NO. : 5,257,523
DATED : November 2, 1993
INVENTOR(S) : Roger A. Hahn, Phillips W. Gold, Harold Cook, Jr.

It is certified that error appears in the above-identified patent and that said Letters Patent is hereby corrected as shown below:

In col. 1, line 15 - delete "is" and insert therefor -- are --

In col. 3, line 14 - between "thereon;" and "redraw" insert -- redraw carriage means for supporting and axially displacing said redraw sleeve relative said elongated ram;

In col. 6, line 44 - delete "248, Fig. 4" and insert therefor -- 248, 250, Fig. 4 --

IN THE CLAIMS:

In col. 17, line 53 - delete "forward" and insert therefor -- rearward --

In col. 17, line 54 - delete "forwardly" and insert therefor -- rearwardly --

In col. 18, line 36 - delete "forward" and insert therefor --rearward --

In col. 18, line 37 - delete "forwardly" and insert therefor -- rearwardly --

Signed and Sealed this

Seventeenth Day of May, 1994

Attest:

BRUCE LEHMAN

*Attesting Officer*     *Commissioner of Patents and Trademarks*